United States Patent Office 3,472,851
Patented Oct. 14, 1969

3,472,851
NOVEL QUINAZOLINYL METHYLAMINO-
BENZOYLAMINO ACID COMPOUNDS
John Davoll, Shepperton, England, assignor to Parke,
Davis & Company, Detroit, Mich., a corporation of
Michigan
No Drawing. Continuation-in-part of application Ser. No.
429,657, Feb. 1, 1965. This application Oct. 11, 1966,
Ser. No. 585,725
Claims priority, application Great Britain, Feb. 20, 1964,
7,239/64
Int. Cl. C07d *51/48;* A61k *27/00*
U.S. Cl. 260—256.4     6 Claims

ABSTRACT OF THE DISCLOSURE

Quinazolinylmethylaminobenzoylamino acid compounds (I):

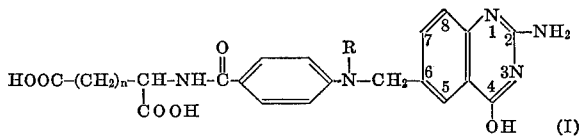

are prepared by hydrolyzing the corresponding N-{p-{[(2,4 - diacylamido - 6 - quinazolinyl)methyl]amino}-benzoyl}-amino acid, lower alkyl di-ester prepared by condensing the corresponding 2,4-diacylamido-6-halomethylquinazoline and N-(p-aminobenzoyl)-amino acid, lower alkyl di-ester; where $n$ is 1 or 2 and R is H or methyl. The compounds possess pharmacological properties and are useful bacteriostatic agents.

SUMMARY AND DETAILED DESCRIPTION

This application is a continuation-in-part of application Ser. No. 429,657 filed Feb. 1, 1965 and now abandoned.

This invention relates to novel chemical compounds and means of producing the same. More particularly, this invention relates to novel chemical compounds derivable from aspartic and glutamic acid, which compounds have the formula:

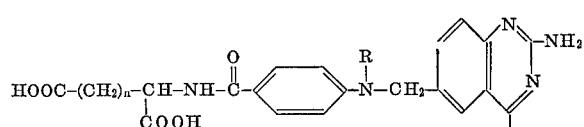

where $n$ is the integer 1 or 2 and R is hydrogen or a methyl group. Like aspartic and glutamic acid, the compounds exist in either of the two optically active D- and L-forms and also in the optically racemic DL-form, all three of which forms as well as mixtures thereof are contemplated by the invention.

In accordance with the invention, these compounds are produced by reacting a 2,4-diacylamido-6-halomethyl-quinazoline of formula:

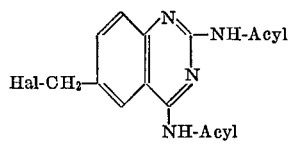

with an N-(p-aminobenzoyl)-amino acid, lower alkyl di-ester, of formula:

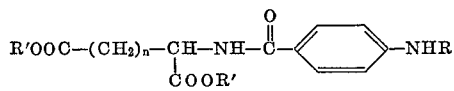

in the presence of an acid acceptor, and hydrolyzing the resultant N-{p-[(2,4 - diacylamido - 6 - quinazolinyl) methyl]amino}-benzoyl}-amino acid, lower alkyl di-ester, of formula

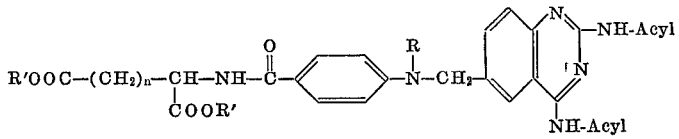

where $n$ and R have the above specified significance; Acyl is an aroyl group or a lower alkanoyl group of 1 to 4 carbon atoms, preferably a benzoyl or acetyl group; R' is a lower alkyl group of 1 to 4 carbon atoms; and Hal is a chlorine, bromine or iodine atom. Where the object is to obtain a product with a particular optical form (either D, L or DL), one uses the amino acid di-ester starting material having the same form. The reaction of the halomethylquinazoline with the amino acid di-ester is carried out in the presence or absence of solvent; at least one equivalent of the di-ester is employed, the use of two equivalents being preferred wherein one mole acts as a weakly basic condensing agent or acid acceptor. If desired, any of a variety of solvents may be employed, for example: lower alkanols, dimethylformamide, ethylene glycol, diethylene glycol and the dimethyl-ether thereof, 2-ethoxyethanol and dioxane. The reaction temperature is subject to considerable variation and is not critical. Conveniently, the reaction is run at temperatures ranging from 25 to 150° C., in periods from 1 to 72 hours. In the absence of a solvent, the preferred conditions are at 90 to 110° C. for 15 to 30 hours. Although the preferred acid acceptor for the reaction is a second mole of the diester, as indicated, one may use a weak inorganic base instead, such as an alkali metal carbonate or bicarbonate.

The hydrolysis is carried out in one step using an alkali metal hydroxide hydrolytic agent or, preferably, in two steps using first an alkali metal alkoxide in an alcoholic medium for deacylation at the 2,4-diamide groups and second an alkaline or acidic agent both to convert the quinazoline 4-amino group to a hydroxyl group and to hydrolze the di-ester groups. For the one-step hydrolysis an aqueous water-miscible organic solvent is employed such as aqueous ethanol, and the reaction is carried out conveniently at reflux temperature. For the two-step hydrolysis, the reaction with the alkali metal alkoxide is preferably carried out at reflux temperature for about 1 to 2 hours; for the second step an aqueous alcoholic solvent is used with mineral acid or an alkali metal hydroxide or carbonate preferably at 20 to 30° C. for periods ranging from 1 to 100 hours.

The compounds of the invention possess pharmacological properties. In particular, the compounds possess antifolic acid activity. The activity is demonstrable by standard tests. In the inhibition test (cf. D. W. Wooley, A Study of Antimetabolites, John Wiley & Sons, New York, 1952, pp. 66–68), for example, the activity is of the same order generally as that of the known anti-folic substance aminopterin. To cite a case, the L-glutamic acid compound having the formula first given above, where R is hydrogen, has shown an anti-folic inhibition index of about unity versus *S. faecalis R*. The compounds therefore are useful as antimetabolites for those applications in which it is desired to antagonize folic acid activity and thereby inhibit metabolic growth. The compounds also have bacteriostatic activity and as shown in standard tests in relatively low concentration (e.g., 50% inhibition at concentrations in the order of one gamma or less/ml.) provide inhibition of organisms such as *S. faecalis R, L. plantarum* and *L. casei*. The compounds are therefore useful as bacteriostatic agents for topical application or in aqueous systems for the inhibition of undesirable effects produced by bacteria. For example, the compounds can be used in dilute solution for the prevention of milk spoilage; they can also be used in solution to minimize decomposition and gas formation in self-contained sanitary disposal or sewage units.

The invention is illustrated by the following examples.

EXAMPLE 1

An intimate mixture of 12.2 g. of 2,4-dibenzamido-6-bromomethylquinazoline and 17.1 g. of ethyl N-(p-aminobenzoyl)-L-glutamate is heated at 100° C. for 24 hours with exclusion of moisture. The crude product, N-{p-{[(2-4-dibenzamido-6-quinazolinyl)methyl]amino}benzoyl}-L-glutamic acid, di-ethyl ester, is dissolved in 240 ml. of hot absolute ethanol and a solution of 3.28 g. of sodium in 126 ml. of absolute ethanol is added. The solution is heated at reflux for 1 hour, then concentrated to a volume of 80 ml. and diluted with 80 ml. of water. After standing at 25° C. for 2 hours, the pH is adjusted to 4 with dilute hydrochloric acid. The crude product, N-{p-{[(2-amino-4-hydroxy-6-quinazolinyl)methyl]-amino}benzoyl}-L-glutamic acid, is removed by filteration and washed with ether and water. For purification, the product (12.47 g.) is suspended in 150 ml. of water, and the mixture stirred with 33.5 ml. of 2.0 N sodium hydroxide and then filtered to remove insoluble material. The filtrate is treated with charcoal, filtered and treated with 33.5 ml. of 2.0 N hydrochloric acid. The precipitated product is removed by filtration, washed in turn with 150 ml. of water, 200 ml. of hot ethanol and 30 ml. of ether, and dried; M.P. 225–240° C. (dec.). Calculated percentage analysis for $C_{21}H_{21}N_5O_6$: C, 57.4; H, 4.8; N, 15.9. Found: C, 57.4; H, 5.4; N, 15.5. In the foregoing procedure, one may substitute in place of the bromomethylquinazoline starting material, an equivalent amount of a corresponding halo-methylquinazoline such as 6-chloro- or iodo-methyl-2,4-dibenzamidoquinazoline; in either case the same final product is obtained. Likewise, one may use other diamides in place of the dibenzamide starting material, e.g., 2,4-di-acetamido-6-bromomethylquinazoline. Similarly, one may use other lower alkyl esters of glutamic acid such as methyl or propyl N-(p-aminobenzoyl)-glutamate. By the same procedure, using the D- or DL-glutamate in place of the L-glutamate starting material, the resulting product is N-{p-{[(2-amino-4-hydroxy-6-quinazolinyl)methyl]amino}benzoyl}-D- or DL-glutamic acid, respectively.

EXAMPLE 2

An intimate mixture of 14.3 g. of 2,4-dibenzamido-6-bromomethylquinazoline and 20.9 g. of ethyl N-(p-methylaminobenzoyl)-L-glutamate is heated, with exclusion of moisture, at 100° C. for 24 hours. The product, N-{p-{[(2,4-dibenzamido-6-quinazolinyl)methyl]methylamino}benzoyl}-L-glutamic acid, diethyl ester, is dissolved in 280 ml. of hot absolute ethanol and a solution of 3.86 g. of sodium in 120 ml. of absolute ethanol is added. The solution is heated at reflux for 2 hours, then concentrated to a volume of 90 ml. and diluted with 90 ml. of water. After standing at 25° C. for 72 hours, the pH is adjusted to 4 with dilute hydrochloric acid and the precipitated product removed by filtration. The product, N-{p-{[(2-amino-4-hydroxy-6-quinazolinyl)methyl]methylamino}-benzoyl}-L-glutamic acid, is washed in turn with water, ether and twice with 125 ml. portions of boiling ethanol, then dried to give a powder; M.P. 200–210° C. with previous darkening.

The corresponding D- and DL-glutamic acid products are produced by the same procedure modified by replacing the L-glutamate starting material with the same amount of the corresponding D- or DL-glutamate.

EXAMPLE 3

2,4-dibenzamido-6-bromomethylquinazoline (6.55 g.) and di-ethyl N-(p-aminobenzoyl)-L-aspartate (8.7 g.) are intimately mixed and kept for 24 hours at 105–108° C. with exclusion of moisture.

The product, N-{p-{[(2,4-dibenzamido-6-quinazolinyl)-methyl]amino}benzoyl}-L-aspartic acid, di-ethyl ester, is treated with dry ethanol (126 ml.) and ethanolic sodium ethoxide (from 1.7 g. of sodium and 55 ml. dry ethanol) and is heated at reflux for 75 minutes. The resulting suspension of yellow solid is evaporated to 45 ml. and treated with water (45 ml.) The resulting clear solution is kept for 24 hours at room temperature, then adjusted to pH 4 with 2 N hydrochloric acid. The solid product which separates, N-{p-{[(2-amino-4-hydroxy-6-quinazolinyl)methyl]amino}benzoyl}-L-aspartic acid, monohydrate, is collected, washed with ether, stirred with hot ethanol (144 ml.), collected and dried. This product is purified by stirring for 2 hours with hydrochloric acid (0.075 N), collecting, and washing with water and ethanol. The product is a pale-yellow powder, darkening above 250° C. without melting.

The aspartate ester starting material for the above procedure is prepared as follows: A solution of L-aspartic acid di-ethyl ester hydrochloride (13.53 g.) in cold, dry ethylene chloride (120 ml.) is treated with p-nitrobenzoyl chloride (13.50 g.). The mixture is shaken and filtered and the filtrate treated, with ice-cooling and shaking, with triethylamine (12.12 g.) added in four portions over about one minute. After standing overnight at room temperature, the mixture is diluted with chloroform (100 ml.), washed with water and aqueous $NaHCO_3$, then dried over magnesium sulfate with the addition of charcoal and evaporated. The product, N-(p-nitrobenzoyl)-

L-aspartic acid, diethyl ester (19.92 g.) in ethanol (250 ml.), is hydrogenated at room temperature and pressure, using as catalyst 10% palladised charcoal. The theoretical volume of hydrogen is absorbed in about 25 minutes. The catalyst is filtered off and the filtrate evaporated to 65 ml. and cleared by heating. On cooling, the product, N-(p-aminobenzoyl)-L-aspartic acid, di-ethyl ester, separates in white needles, M.P. 116–117° C.

EXAMPLE 4

2,4-dibenzamido-6-bromomethylquinazoline (15.0 g.) and N-(p-methylaminobenzoyl)-L-aspartic acid, di-ethyl ester (21.0 g.) are shaken together in chloroform (100 ml.) and the solvent evaporated in vacuo. The residual homogeneous mixture is kept for 24 hours at 110° C. with exclusion of moisture. The product, N-{p-{[(2,4-dibenzamido-6-quinazolinyl)-methyl]methylamino}benzoyl} - L-aspartic acid, di-ethyl ester, is treated with dry ethanol (293 ml.) and ethanolic sodium ethoxide (from 4.05 g. of sodium and 126 ml. dry ethanol), and heated at reflux for 2 hours. The resulting suspension of yellow solid is evaporated to 95 ml. and treated with water (95 ml.). After 5 hours at room temperature, the solution is filtered and adjusted to pH 4 with 2 N hydrochloric acid. The separated solid is collected, washed with ether (50 ml.) and then resuspended in boiling ethanol (260 ml.). The product, N-{p-{[(2-amino-4-hydroxy - 6 - quinazolinyl) methyl]-methylamino}-benzoyl}-L-aspartic acid, is collected, triturated in ether and the resulting yellow powder purified by stirring for 2 hours with hydrochloric acid (0.15 N; 176.5 ml.), collecting and washing with water; M.P. 265–275° C. (dec.). By the same procedure but replacing the L-aspartate starting material with the corresponding D- or DL-isomer, one obtains N-{p-{[(2-amino - 4-hydroxy-6-quinazolinyl)methyl]methylamino}-benzoyl}-D- or DL-aspartic acid, respectively.

The aspartic acid ester starting material for the above procedure is prepared as follows:

Oxalyl chloride (10.2 g.) is added to a suspension of p-(N-benzyl-N-methylamino)benzoic acid (16.9 g.) in dry benzene (70 ml.). The mixture is kept for 2 hours at room temperature (gas steadily evolves), then slowly heated to reflux. The resulting clear yellow solution is evaporated in vacuo to a syrup. A solution of the residual product, p-(N-benzyl-N-methylamino)benzoyl chloride, in dry ethylene chloride (140 ml.) is treated with L-aspartic acid, diethyl ester, hydrochloride (17.4 g.) which dissolves without evolution of heat. This solution is treated, with stirring and ice-cooling, with triethylamine (24.5 g., 33.7 ml.). After 5 minutes in ice, the mixture is kept for 3 days at room temperature, then diluted with an equal volume of chloroform. This solution is washed with water and aqueous sodium bicarbonate, dried over magnesium sulfate and evaporated, to give crude N - [(p-(N'-benzyl-N'-methylamino)-benzoyl]-L-aspartic acid, diethyl ester, as a colorless syrup. This product is evapoarted twice with ethanol, then dissolved in 96% ethanol (150 ml.) and kept 1½ hours at room temperature with Raney nickel and charcoal. After filtration, the filtrate is hydrogenated with 10% palladised charcoal at room temperature and atmospheric pressure until hydrogen uptake ceases, at which time the mixture is filtered and the filtrate evaporated. The residual syrup is dissolved in chloroform (150 ml.) and washed with hydrochloric acid (0.5 N; 150 ml.) and aqueous sodium bicarbonate, dried over magnesium sulfate (with charcoal) and evaporated. The residual product, N-(p-methylaminobenzoyl)-L-aspartic acid, di-ethyl ester, is sufficiently pure for use as a starting material; Calculated percentage analysis for $C_{16}H_{22}N_2O_5$: C, 59.6; H, 6.9; N, 8.7; Found: C, 59.9, H, 6.9, N, 8.3.

EXAMPLE 5

2,4-dibenzamido-6-bromomethylquinazoline (16.2 g., 0.035 M) and diethyl p-aminobenzoyl-D-aspartate (21.6 g., 0.07 M) are intimately mixed and kept at 104° C. for 19 hours with exclusion of moisture.

The product, N-{p-{[(2,4-dibenzamido-6-quinazolinyl)-methyl]amino}benzoyl}-D-aspartic acid, diethyl ester, is treated with dry ethanol (315 ml.) and ethanolic sodium ethoxide (from 4.0 g., 0.174 M of sodium and 138 ml. of dry ethanol) and boiled under reflux for two hours. The reaction mixture is evaporated to 120 ml. and treated with water (120 ml.). The resulting solution is kept for 24 hours at room temperature, filtered and adjusted to pH 4 with 2 N hydrochloric acid. The solid product which separates, N-{p-{[(2-amino-4-hydroxy-6-quinazolinyl)methyl]amino}benzoyl} - D - aspartic acid, monohydrate, is collected, washed with ether, stirred with hot ethanol (350 ml.), collected, stirred again for two hours with 0.075 N hydrochloric acid (300 ml.), collected, washed with water and ethanol, and dried; the product has no characteristic melting point and darkens when heated above 250° C. The corresponding DL-form of the product is obtained by this same procedure using the DL-aspartate in place of the above D-aspartate starting material.

The aspartate ester starting material for the above procedure is prepared as follows:

A solution of D-aspartic acid diethyl ester hydrochloride (18.44 g., 0.0817 M) in cold, dry ethylene chloride (163 ml.) is treated with freshly prepared p-nitrobenzoyl chloride (15.14 g., 0.0817 M). The clear solution which forms on shaking is treated, while ice-cooling and shaking, with triethylamine (15.92 g., 0.166 M) added in four portions over about one minute, the temperature reaching 40° C. After 18 hours at room temperature, the mixture is diluted with chloroform (300 ml.), washed with water and with aqueous $NaHCO_3$, dried over $MgSO_4$ with addition of charcoal, and evaporated. The crystalline residue, consisting of N-(p-nitrobenzoyl)-D-aspartic acid, diethyl ester, is taken up in ethanol (350 ml.) and hydrogenated at ordinary temperature and pressure, using 10% palladised charcoal catalyst. Reduction is complete in 70 minutes, and after filtration from catalyst the filtrate is evaporated to 80 ml., cleared by heating and allowed to crystallize. The crystalline product is N-(p-aminobenzoyl)-D-aspartic acid, diethyl ester; M.P. 116–118° C.

What is claimed is:

1. An amino acid compound of formula:

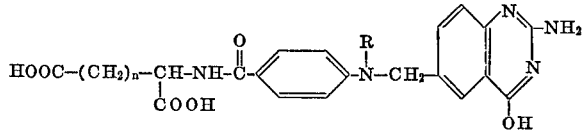

where $n$ is the integer 1 or 2 and R is hydrogen or a methyl group.

2. An amino acid compound according to claim 1 where $n$ is 1 and R is hydrogen, which compound is is N-{p-{[(2-amino-4-hydroxy - 6 - quinazolinyl)methyl] amino}benzoyl}-L-aspartic acid.

3. An amino acid compound according to claim 1 where $n$ is 2 and R is hydrogen, which compound is N-{p-{[(2-amino-4-hydroxy - 6 - quinazolinyl)methyl] amino}benzoyl}-L-glutamic acid.

4. An amino acid compound according to claim 1 where $n$ is 1 and R is a methyl group, which compound is N-{p-{[2-amino-4-hydroxy - 6 - quinazolinyl)methyl] methylamino}benzoyl}-L-aspartic acid.

5. An amino acid compound according to claim 1 where $n$ is 2 and R is a methyl group, which compound is N-{p-{[(2-amino - 4 - hydroxy-6-quinazolinyl)methyl] methylamino}benzoyl}-L-glutamic acid.

6. An amino acid compound according to claim 1 where $n$ is 1 and R is hydrogen, which compound is N-{p-{[(2-amino - 4 - hydroxy-6-quinazolinyl)methyl]amino}benzoyl}-D-aspartic acid.

References Cited

UNITED STATES PATENTS 2,790,802   4/1957   Brockman et al. ____ 260—256.4

FOREIGN PATENTS 1,021,196   3/1966   Great Britain.

OTHER REFERENCES

Koehler et al., J. Am. Chem. Soc., vol. 80 (1958), pp. 5779–85.

ALEX MAZEL, Primary Examiner

R. J. GALLAGHER, Assistant Examiner

U.S. Cl. X.R.

424—251